(12) United States Patent
Tilbürger

(10) Patent No.: US 9,499,187 B2
(45) Date of Patent: Nov. 22, 2016

(54) SHOPPING TROLLEY HAVING A DOCKING STATION AND COIN DEPOSIT LOCK

(71) Applicant: Frank Tilbürger, Ganderkesee (DE)

(72) Inventor: Frank Tilbürger, Ganderkesee (DE)

( * ) Notice: Subject to any disclaimer, the term of this patent is extended or adjusted under 35 U.S.C. 154(b) by 0 days.

(21) Appl. No.: 14/651,766

(22) PCT Filed: Dec. 16, 2013

(86) PCT No.: PCT/IB2013/002773
§ 371 (c)(1),
(2) Date: Oct. 30, 2015

(87) PCT Pub. No.: WO2014/091296
PCT Pub. Date: Jun. 19, 2014

(65) Prior Publication Data
US 2016/0039442 A1  Feb. 11, 2016

(30) Foreign Application Priority Data

Dec. 14, 2012  (AT) .................................... 1299/2012
Dec. 14, 2012  (AT) ................................ A 1298/2012

(51) Int. Cl.
*B62B 3/14*   (2006.01)
*G07F 7/06*   (2006.01)
(Continued)

(52) U.S. Cl.
CPC ............. *B62B 3/1472* (2013.01); *A47F 10/04* (2013.01); *B62B 3/18* (2013.01); *G07F 7/0672* (2013.01); *G07F 7/0681* (2013.01); *G07F 17/0057* (2013.01)

(58) Field of Classification Search
CPC .. B62B 3/1404; B62B 3/1428; B62B 3/1432
USPC .................................................. 280/33.994
See application file for complete search history.

(56) References Cited

U.S. PATENT DOCUMENTS 4,645,057 A * 2/1987 Schramme ............ B62B 3/1404
194/239
4,766,989 A * 8/1988 Maloeuvre ............ A47F 10/045
194/257
(Continued)

FOREIGN PATENT DOCUMENTS

DE       19621823 A1   12/1997
KR    20120031768 A    4/2012
(Continued)

OTHER PUBLICATIONS

International Preliminary Report on Patentability issued Jun. 18, 2015 in International Application No. PCT/IB2013/002773.
(Continued)

*Primary Examiner* — Jeffrey J Restifo
(74) *Attorney, Agent, or Firm* — Panitch Schwarze Belisario & Nadel LLP

(57) ABSTRACT

A shopping trolley is provided, including a shopping basket (1) having a grab bar (2) and wheels (3), a chain lock (4) and a coin deposit lock (5), the shopping trolley having a docking station (6) for a portable electronic device with a holder (7) for the device, a power source (8), and means (9) for transferring energy from the power source (8) to the device. The docking station (6) includes a detector for detecting when the device is inserted into the holder (7) and when the device is connected to the energy transfer means (9). The coin deposit lock (5) includes an electromagnetic locking mechanism. The detector is able to emit an electrical or electromagnetic signal to the electromagnetic locking mechanism of the coin deposit lock (5), which has a receiver that is able to trigger the unlocking of the chain lock (4).

17 Claims, 4 Drawing Sheets

(51) Int. Cl.
*A47F 10/04* (2006.01)
*B62B 3/18* (2006.01)
*G07F 17/00* (2006.01)

(56) References Cited

U.S. PATENT DOCUMENTS

| | | | | |
|---|---|---|---|---|
| 4,868,544 | A * | 9/1989 | Havens | G08B 13/14 |
| | | | | 180/167 |
| 5,069,324 | A * | 12/1991 | Lepage | G07F 7/0654 |
| | | | | 194/212 |
| 5,250,789 | A * | 10/1993 | Johnsen | B62B 3/142 |
| | | | | 235/383 |
| 5,361,871 | A * | 11/1994 | Gupta | B62B 3/1408 |
| | | | | 186/52 |
| 5,513,507 | A * | 5/1996 | Merchel | E05B 35/002 |
| | | | | 235/382 |
| 5,589,677 | A * | 12/1996 | Merchel | E05B 35/002 |
| | | | | 235/383 |
| 5,836,051 | A * | 11/1998 | Myers | B62B 3/1408 |
| | | | | 16/436 |
| 7,036,725 | B2 * | 5/2006 | Blaeuer | B62B 3/1408 |
| | | | | 235/383 |
| 8,336,774 | B2 * | 12/2012 | Crum | G06Q 30/0207 |
| | | | | 235/380 |
| 8,905,305 | B2 * | 12/2014 | Crum | G06Q 30/06 |
| | | | | 235/375 |
| 8,973,928 | B2 * | 3/2015 | Mellinger | B62B 9/26 |
| | | | | 224/409 |
| 9,053,510 | B2 * | 6/2015 | Crum | G06Q 30/02 |
| 9,126,616 | B2 * | 9/2015 | Crum | B26B 5/00 |
| 2004/0111320 | A1 * | 6/2004 | Schlieffers | A47F 9/047 |
| | | | | 705/16 |
| 2005/0035198 | A1 | 2/2005 | Wilensky | |
| 2006/0254861 | A1 * | 11/2006 | Perrier | B62B 3/1416 |
| | | | | 186/26 |
| 2009/0058357 | A1 * | 3/2009 | Saker | B62B 3/1404 |
| | | | | 320/107 |
| 2012/0119874 | A1 | 5/2012 | Ciervo et al. | |
| 2015/0032559 | A1 * | 1/2015 | Sonnendorfer | H04M 1/0254 |
| | | | | 705/21 |
| 2016/0039442 | A1 * | 2/2016 | Tilburger | G07F 7/0672 |
| | | | | 280/33.992 |

FOREIGN PATENT DOCUMENTS

| | | |
|---|---|---|
| NL | 1010245 C1 | 4/2000 |
| WO | 9855954 A1 | 12/1998 |
| WO | 2006117627 A1 | 11/2006 |
| WO | 2010123427 A1 | 10/2010 |

OTHER PUBLICATIONS

International Search Report issued May 20, 2014 in International Application No. PCT/IB2013/002773.
Demand for International Preliminary Examination and Article 34 Amendments filed Oct. 14, 2014 in International Application No. PCT/IB2013/002773.
Written Opinion issued Nov. 21, 2014 in International Application No. PCT/IB2013/002773.
Response to Written Opinion filed Jan. 21, 2015 in International Application No. PCT/IB2013/002773.
Office Action issued Nov. 6, 2013 in AT Application No. A 1299/2012.
Office Action issued Nov. 15, 2013 in AT Application No. A 1298/2012.

* cited by examiner

SHOPPING TROLLEY HAVING A DOCKING STATION AND COIN DEPOSIT LOCK

CROSS-REFERENCE TO RELATED APPLICATIONS

This application is a Section 371 of International Application No. PCT/IB2013/002773, filed Dec. 16, 2013, which was published in the German language on Jun. 19, 2014, under International Publication No. WO 2014/091296 A1 and the disclosure of which is incorporated herein by reference.

BACKGROUND OF THE INVENTION

The invention relates to a shopping trolley having an option of connecting with a portable electronic device.

For a long time, small specialized stores have been increasingly forced out of the market and have been largely replaced by supermarkets, for example food or DIY stores. These stores become larger and larger, which is the reason why it is getting even more difficult for customers to find their way in such huge stores. Although most big supermarkets and DIY stores have guidance systems in the form of color codes of particular departments or labels of the individual shelves, from a great distance they are often not sufficiently recognizable, especially for people with a visual impairment.

Furthermore, during the last years, it has become common practice that particular goods or indicating labels of goods are provided with a so called QR code ("quick response code") which can be scanned with a portable electronic device that is equipped with a camera, such as a mobile phone or a portable computer (e.g. notebook, netbook or tablet PC), and provides the customer with additional information about the goods. Since the routes, and accordingly the time spent, in the supermarket are getting longer and longer, the device frequently runs out of power early.

On the other hand, the need to deposit a coin for a shopping trolley with chain lock and coin deposit lock in order to be able to take a trolley from the shopping trolley line can sometimes constitute a problem when the customer does not have a corresponding coin, especially when the shopping trolley line is far away from the next cash desk of the supermarket, e.g. at a parking lot.

WO 98/55954 A1 discloses a mobile computer system which is mounted, among other things, on a shopping trolley which includes a docking station for a portable electronic device which is called "customer terminal" or "data collection device", as well as various other devices mounted on the shopping trolley, such as scanners, printers, credit card readers and the like, for example. The portable electronic device exactly fits the docking station, i.e. a recess therein, with its form, but can be removed therefrom. The terminal is wirelessly connected to a central computer to transmit information to customers or sales assistants working with it, and is battery-powered. The docking station, which is preferably mounted on the grab bar of the trolley, includes for its part a power source for charging the battery of the terminal when it is inserted in the docking station.

U.S. 2005/035198 A1 discloses a similar computer system, which can, among other things, be mounted on a traditional shopping trolley (e.g. in the child's seat), but is designed for a sales assistant rather than for a customer in a shop. For this reason, it can also additionally include cash drawers, wastepaper baskets, label printers and the like. Here as well, a "wireless computer" is insertable in a docking station and removable from it, and when inserted, it can be supplied with power, i.e. charged, by the same. Again, the portable electronic device and the docking station are exactly adapted to each other, or the device is fixedly mounted on a carrier of the docking station to prevent theft.

WO 2006/117627 A1 describes a display that is fixedly mounted on the grab bar of a shopping trolley which can have several connections, among them also USB ports. Therein, a battery is provided which can be charged after connecting the shopping trolley to another one of a shopping trolley line from an external power source by means of connection cables between the individual trolleys.

WO 2010/123427 A1 discloses a shopping trolley which includes a rotor which works together with a stator situated in the floor and therefore acts both as an immobilizer and a power generator. Optionally, the shopping trolley therefore also includes an accumulator and/or one or more connections for current drain.

U.S. 2012/119874 A1 discloses a base station or docking station for a portable electronic device, which includes a bolt mechanism for the device and a RFID reader, so that the bolt mechanism can be unlocked with a RFID chip that is accomodated, e.g., in a customer card, when an interaction with the RFID reader is present.

KR 2012/0031768 A describes a shopping trolley with a user terminal which is fixedly mounted on the grab bar, and an electrically unlockable bolt mechanism.

U.S. Pat. No. 5,513,507 A finally discloses a coin deposit lock for a shopping trolley or a luggage trolley with an electromagnetic bolt mechanism, which can be unlocked with a magnetic card.

These prior art documents only insufficiently solve the initially described problems, and therefore it was an object of the invention to provide more comprehensive solutions.

BRIEF SUMMARY OF THE INVENTION

In one general embodiment, the invention provides a shopping trolley, comprising a shopping basket with a grab bar and at least three wheels at its bottom side, a chain lock and a coin deposit lock for connecting the shopping trolley with another one of the same type in a shopping trolley line, a docking station for a portable electronic device being provided on the shopping trolley, said docking station comprising a holder for the device, a power source as well as energy transfer means from the power source to the device, wherein:

a) the docking station comprises a detector for detecting the insertion or placement of the portable electronic device in the holder and/or the connection of the device to the energy transfer means;

b) the coin deposit lock comprises an electromagnetic bolt mechanism which is electrically connected to the detector of the docking station;

c) the detector of the docking station is able, when the insertion of the portable electronic device in the holder and/or the connection of the device to the energy transfer means is detected, to emit an electrical or electromagnetic signal to the electromagnetic bolt mechanism of the coin deposit lock; and d) the electromagnetic bolt mechanism of the coin deposit lock comprises a receiver which is able to receive the signal and to trigger the unlocking of the chain lock on receipt of the signal.

In another general embodiment, the invention provides shopping trolleys which are equipped with a docking station which does not have an operative connection with the coin deposit lock, but only charges the portable electronic device of the customer while he is shopping. Specifically, herein disclosed is a shopping trolley which comprises a shopping basket with a grab bar and at least three wheels at its bottom side, as well as optionally a chain lock and a coin deposit lock for connecting the shopping trolley with another one of the same type, whereby a docking station for a portable electronic device is provided on the shopping trolley, the docking station including a holder for the device, a power source as well as means for energy transfer from the power source to the device in order to charge the battery of the portable electronic device, wherein:

1) the holder is size adjustable and thus adapted for taking up portable electronic devices of different sizes, the holder being size adjustable preferably in both a horizontal and a vertical direction; and 2) the energy transfer means include multiple electric plugs of different formats, preferably multiple micro USB plugs with the respective state-of-the-art plug formats of different manufacturers.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
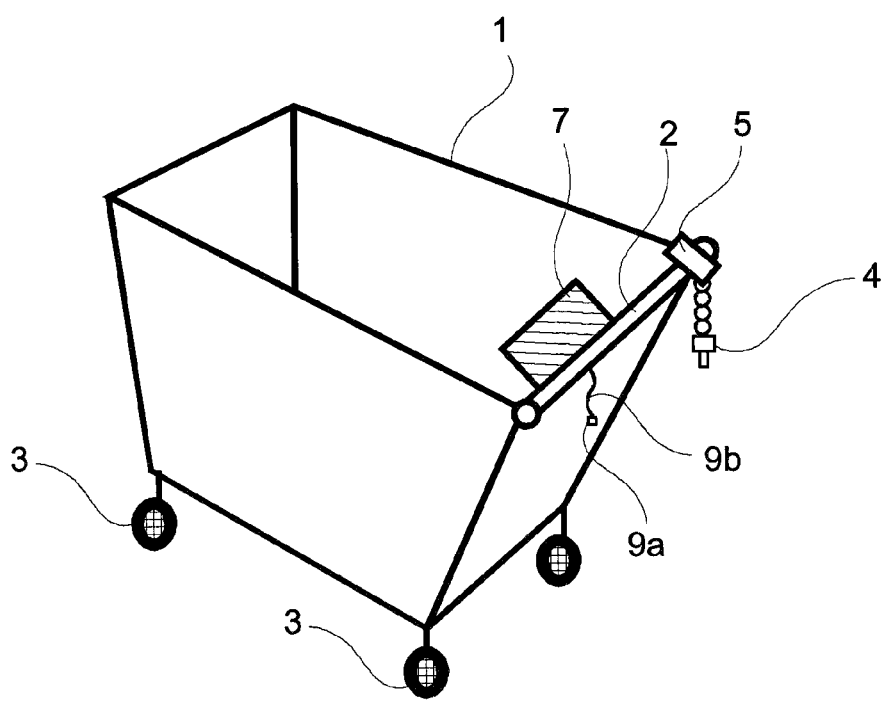
FIG. 1 is a schematic total view of a shopping trolley according to an embodiment of the invention.

The invention provides a shopping trolley, comprising a shopping basket with a grab bar and at least three wheels at its bottom side, a chain lock and a coin deposit lock for connecting the shopping trolley with another one of the same type in a shopping trolley line, a docking station for a portable electronic device being provided on the shopping trolley, said docking station comprising a holder for the device, a power source as well as energy transfer means from the power source to the device, wherein:

a) the docking station comprises a detector for detecting the insertion or placement of the portable electronic device in the holder and/or the connection of the device to the energy transfer means;

b) the coin deposit lock comprises an electromagnetic bolt mechanism which is electrically connected to the detector of the docking station;

c) the detector of the docking station is able, when the insertion of the portable electronic device in the holder and/or the connection of the device to the energy transfer means is detected, to emit an electrical or electromagnetic signal to the electromagnetic bolt mechanism of the coin deposit lock; and d) the electromagnetic bolt mechanism of the coin deposit lock comprises a receiver which is able to receive the signal and to trigger the unlocking of the chain lock on receipt of the signal.

The customer can thus charge the battery of his portable electronic device on such a shopping trolley of the invention. This can occur wirelessly, i.e. by means of induction charging, or by connecting to a port of the docking station for the device. At the same time, the coin deposit lock is unlocked by inserting or placing the portable electronic device in a holder of the docking station and/or by connecting the device to a port of the docking station, whereby the portable electronic device replaces the traditional deposit. The customer does not need to have a suitable coin with him, but only a portable electronic device, which today, the majority of the population has with them anyway in the form of a mobile phone or recently also in the form of a tablet PC. Because the device replaces the traditional deposit, the lock will herein continually be referred to as coin deposit lock, whether or not it is able to receive a traditional deposit coin, as is illustrated further hereafter. By the present invention, for the first time, a shopping trolley is provided in which the customer can charge his own mobile phone (i.e. one he brought with him) or tablet PC, respectively, and use it as a "deposit" for the coin deposit lock at the same time.

For the abovementioned reasons, the portable electronic device is preferably a mobile phone, e.g. a smartphone, or a tablet PC, although in principle, also laptops, notebooks or netbooks with a physical keyboard are included in the invention, as long as they can be inserted in the holder for the device and are able to establish a connection, e.g. also a wireless connection, with the device. The option of seeing the display of the device and operating the device if necessary while it is in the holder exists especially for mobile phones and tablet PCs, of course. However, the term tablet PC does not only include the common "tabs" such as Apple's "iPad" or Samsung's "Galaxy Tab", for example, but also laptops with removable display, which can then be used as tablet PC.

The type of the shopping trolley is not specifically limited and all common types of shopping trolleys can be equipped with a docking station of the invention and a corresponding electrically or electromagnetically unlockable coin deposit lock. Because the principle of the invention is also unrestrictedly applicable to luggage trolleys, like such trolleys that are provided at airports or railway stations, for example, the term "shopping trolley" consistently also includes such trolleys, as long as it is not explicitly stated otherwise.

The term "docking station" means a charging or docking station for the electronic device with corresponding ports and connection options, respectively (i.e. also wirelessly), with a power source and optionally a data memory which is integrated in the docking station, the docking station comprising a holder in or on which the device can be inserted or placed or put, and preferably can be locked in this position. With the docking station, the battery of the device at least can be charged, but it can also be able to transfer data, such as advertisements or a site plan of the store, for example, to the memory of the docked device. For this purpose, the docking station preferably comprises a data memory, especially a memory chip. Alternatively or additionally, it can also be equipped with a receiver which is able to receive data from an external data source such as e.g. from a server of the store, and to forward the data to the docked electronic device.

As a lock that is suitable for interacting with the docking station, numerous embodiments of electromagnetic locks, i.e. electric locks, are commercially available, so that a person skilled in the art can easily select a model that is suitable in terms of construction and costs, and can optionally mount it on an otherwise traditional shopping trolley after adapting the bolt mechanism to the form of the chain lock.

Thus, for example both mechanical and mechanoelectrical coin deposit locks are available from Systec POS-Technology GmbH (Puchheim, near Munich, Germany) or from Wanzl Metallwarenfabrik GmbH (Leipheim, Germany). Apart from coin deposit locks, the latter also offers RFID tracking and wheel locking systems for shopping trolleys.

In a preferred embodiment of the invention, the device includes a holder for the portable electronic device, which additionally includes a locking mechanism for fixing the portable electronic device in it, the locking mechanism being in mechanical and/or electrical operative connection with the bolt mechanism of the coin deposit lock alternatively or additionally to establishing an electrical connection of the portable electronic device with a port of the docking station. By actuating the locking mechanism after placing or inserting the portable electronic device in the holder, an unlocking of the bolt mechanism of the coin deposit lock can be triggered.

Such a holder with an own locking mechanism prevents the portable electronic device from falling out of the holder. This locking mechanism should be easily mechanically unlockable, e.g. by pressing a button or actuating a lever, but preferably by inserting a pin or a similar member, e.g. in the form of a key, which can be removed from the holder (or also from another part of the shopping trolley) after the locking mechanism is engaged and can be kept separately from the shopping trolley. This represents an anti-theft system for the portable electronic device, so that the customer can make his purchases in a reassured manner without having to see the shopping trolley at all times.

According to the present invention, in addition to the unlocking after the insertion of the portable electronic device in the docking station, the coin deposit lock can optionally, when an electrical connection is established at the same time, be unlockable by inserting a deposit in a traditional way. In this case the coin deposit lock also includes a slide for inserting a traditional deposit, such as e.g. a coin. This enables an unlocking of the lock also in cases when no connection between the detector of the docking station and the bolt mechanism of the lock can be established, e.g. during mechanical of electronic failure or lack of power in the system.

In every case, it can be intended that the locking mechanism which locks the portable electronic device in the holder, can only be unlocked if the chain lock of another trolley or, if possible, additionally a deposit, such as a coin, is inserted into the coin deposit lock. This prevents the shopping trolley being available for the customer after removing the portable electronic device from the holder, also without a deposit, in which case the customer would not need to bring back the trolley to a shopping trolley line in order to get back his deposit. In cases where the shopping trolley is equipped with an electronic security system, which effectively prevents that the trolley is moved further than a particular distance from the store or over a trigger line (e.g. a subterranean antenna cable), with a wheel clamp from Rocateq in Heilbronn (Germany), or with a "Radlok" system from Wanzl in Leipheim (Germany), for example, the slide for a traditional deposit can be completely omitted.

The signal which is emitted by the detector of the docking station can either be an electrical signal, a radio signal, an infrared signal, or a combination thereof. In each case, the signal is transferred to a corresponding receiver of the coin deposit lock, which then releases the chain lock. Electrical signals provide the advantage that only the lock of the first shopping trolley in a shopping trolley line is unlocked. Whereas in the case of infrared signals, a direct optical connection between the detector of the docking station and the receiver of the bolt mechanism is needed, which is possibly unknowingly prevented by the user, i.e. the customer using the shopping trolley, or which he is not aware of. When using a radio signal, the range of the transmitter has to be selected exactly so that the locks of other shopping trolleys in the line are not unlocked as well, but contrary to the electrical signal, it provides the advantage of not needing an electrical wire between the docking station and the coin deposit lock.

A combined mechanoelectrical operative connection between the locking mechanism of the holder and the electromagnetic bolt mechanism of the lock can for example be established via a piezoelectric element to which pressure is applied upon actuating the locking mechanism after placing or inserting the device in the holder. In response, the piezoelectric element generates a voltage which is detectable by the detector of the docking station, which can then trigger the unlocking of the coin deposit lock. Such piezoelectric elements are commercially available as piezo-switches, sensors, contact switches and actuators, e.g. from Danielson in Hardenberg (Netherlands), Meggitt Sensing Systems in Fribourg (Switzerland), PCB Piezotronics Inc. in Depew (N.Y., USA) or Kistler GmbH in Vienna (Austria).

The power source of the shopping trolley of the invention can be a simple battery. In a preferred embodiment the power source is an accumulator which is chargeable, which preferably occurs when the shopping trolley is reconnected with the shopping trolley line. The form and dimensions of the battery or the accumulator are not specifically limited. Preferably, however, they are formed in such a way that the power source can be accomodated within the handle bar of the shopping trolley. Of course, the power has to be selected in such a way that the batteries of most portable electronic devices are chargeable with it, which currently are mostly Li-ion batteries with a voltage of 3.7 V.

As mentioned above, the energy transfer for charging the battery of the portable electronic device can occur via a power supply line or wirelessly. In the first case, the energy transfer means comprise preferably at least one electrical plug (hereinafter shortly referred to as plug), and the detector is able to detect an electrical connection between the portable electronic device and the at least one plug and to trigger the unlocking of the coin deposit lock upon detection of such an electrical connection. Preferably, a model that corresponds to a standard that is accepted by one of numerous manufacturers of laptops, tablet PCs and smartphones is selected as such a plug. Currently, such a plug will most preferably be a UBS plug, for mobile phones preferably a plug that corresponds to the micro USB standard. Furthermore, via this plug, not only energy, but also data can be transmitted.

The at least on plug can be provided fixedly, i.e. immobile, on the shopping trolley, preferably on or in the holder for the portable electronic device or on the grab bar, or it may be connected therewith via a cable, e.g. a cable that automatically winds around a coil or that gets tightened. The connection via a cable offers more freedom concerning the position and form of the holder, especially concerning the distance between the portable electronic device that is inserted into the holder and the handle bar, considering the position of the port, such as e.g. the UBS port on the device, can be provided laterally or at the lower rim of the device depending on the model, for example for smartphones.

Because there exists no consistent standard for such plugs among the different device manufacturers, not even for UBS plugs, and the plug format is sometimes changed over time by the same manufacturer, the invention intends that more plugs of different formats are provided. Of course, in the case of changes of the most common formats, they can be replaced subsequently by respective state-of-the-art plug formats. In this case, all of these plugs are preferably not fixedly mounted, but rather mounted on or in the docking station via a cable, e.g. an extendable cable that is wound around a coil as described above.

Because not only the plug formats, but especially also the dimensions of the possible portable electronic devices of the invention vary strongly, in especially preferred embodiments, the holder is size adjustable and therefore adapted to accommodate portable electronic devices of different sizes. Preferably, the holder is size adjustable in both a horizontal and vertical direction.

An especially preferred embodiment of the holder includes two L profiles which are carried by a movable rod assembly and can be shifted horizontally to each other, which together form a frame for the portable electronic device. Each of the L profiles can at its bottom side have a flat partial element not lying at the same level, but together they nevertheless form a base for placing the portable electronic device on it. Upon usage, the portable electronic device is placed with at least two of its rims on the two flat partial elements, and then the L profiles on the rod assembly are shifted towards each other until they narrowly enclose the four rims of the portable electronic device. The rod assembly can thereby be biased by means of one or more springs in order to be pressed or pulled in a starting position via those springs, whereby the starting position can correspond to the minimum or the maximum distance of the L profiles.

Such an embodiment is especially suitable for smartphones and tablet PCs, which on the one hand have a flat design and on the other hand have a sufficient size in order to be able to be placed with at least two rims on the two flat partial elements when the holder is in the open starting position. In this open starting position, the inner rims of the two flat partial elements therefore have for example a distance of a maximum of 10 cm to each other in order to be able to have a traditional smartphone placed on it, whereas the opposite sides of the two L profiles should have a longitudinal distance of at least 25 cm and a latitudinal distance of at least 20 cm in the open starting position in order to be able to place even the biggest common tablet PCs in the holder.

The L profiles can additionally also consist of two halves that are connected to each other via a rod assembly, which are moveable in a vertical direction to each other in order to be able to vary the thickness of the frame that is formed by the two L profiles. The vertical cross-sectional shape of the L profile halves thereby is preferably also L shaped, and more preferably has the form of a quarter of a circle in order to firmly enclose the portable electronic device without damaging, i.e. pushing in or scratching, the rims. Because of the same reason, the L profiles preferably consist of a resilient and flexible plastic material, e.g. vulcanite, or their inner sides are coated with such a material.

The components of the rod assembly, on which the two L profiles are mounted, and/or of those, on which the two halves of an L profile are mounted, of course have to be moveable also relative to each other in order to be able to move the profiles or the profile halves closer to each other or apart from each other. In this case, they can either bypass each other, e.g. side by side or one below the other (e.g. in the form of scissor levers or lever/spring constructions), or else they can be telescoped into one another (e.g. in telescopic construction), which amongst other things depends on the difference between the minimum and the maximum distance of the ends. For example, for the vertical shift of both halves of one L profile, two rods telescoping into one another would be ideal, because here only a difference in distance of a few centimeters, e.g. 2 to 4 cm, needs to be covered. With a maximum distance of 4 cm, even the thickness of a common laptop can be very easily enclosed by the L profile halves.

For wireless energy transfer to the portable electronic device, i.e. induction charging, the energy transfer means preferably include an electrical field generator which is connected to the power source. In this case, the portable electronic device has to be equipped with an induction coil as has recently been offered in the devices of several smartphone manufacturers, e.g. in the cover of the battery compartment. Again, of course, the voltage of the power source and the electrical field produced by the generator have to be adapted to the batteries of the devices, which one of ordinary skill in the art is able to do without undue experimentation.

In order to not limit the functionality of the shopping trolley and to guarantee an easy access to the shopping basket, but also to ensure good visibility and optionally operability of the portable electronic device after docking, the holder of the docking station is preferably mounted on the grab bar of the shopping basket and can be provided in the center or else at the left or right end.

As mentioned above, the power source is preferably an accumulator itself which is chargeable via energy transfer from an external power source. This charging process preferably occurs after the shopping trolley has been put back to its intended place in or in front of the store, and again either via a power supply line or wirelessly. In a preferred embodiment, the charging of the accumulators can occur after the shopping trolley, which in this case has to dispose of a chain lock and a coin deposit lock, has been connected to the shopping trolley line via the chain lock, whereby the chain lock at the same time serves as a power supply line for the energy transfer from the external power source to the accumulator of the shopping trolley. Alternatively or additionally, the power source of the docking station can also dispose of an induction coil and can be charged wirelessly by the external power source. For this purpose, an electrical field generator is provided preferably in the area of the shopping trolley line at the intended place.

However, the charging of the accumulator as a power source may additionally or alternatively to the above described embodiments also occur with movements of the shopping trolley, namely by providing one or more wheels with electric generators for charging the accumulator, which convert the kinetic energy in electric energy. In this case, the generators serve as "external power source".

According to preferred embodiments of the present invention, two things are especially essential:

i) The docking station includes a detector which is able to detect the insertion of the portable electronic device in the holder and/or the connection of the device with the plug and then to emit an electrical signal to the coin deposit lock. In the latter case, the detection can occur when an electrical connection between the portable electronic device and the power source is established, i.e. upon connecting the device with the plug, whereupon a control unit that is integrated in the detector generates an electrical signal. By inserting the device in the holder and/or by putting it on the plug, a switch which emits a piezoelectric impulse can be actuated. For this purpose, the switch can include for example a piezoelectric element, e.g. of piezoelectric ceramics, which generates a voltage when pressure is applied. In every case, an electrical signal is emitted by the detector to the coin deposit lock.

ii) The coin deposit lock includes an electromagnetic bolt mechanism instead of or in addition to the traditional slide with the recess for the deposit, which unlocks upon receipt of a corresponding signal of the detector and releases the chain lock. Especially if the lock does not have a traditional slide, a number of common electrical locks (e.g. with one or else two horizontally shiftable drive bolts) is taken into consideration, from which a person of ordinary skill in the art can easily select an appropriate one, adapt the bolt to the form of the chain lock or vice versa, and mount it on a shopping trolley.

The type of the holder of the docking station is in general not specifically limited, as long as the portable electronic device can be carried thereon or therein and can be secured against falling down or falling out. The holder can for example include a simple three-dimensional rod assembly or grid, e.g. a basket, or a frame, which each should have sufficient rigidity and in which the portable electronic device can be inserted or slid in. Preferably, however, it includes a flat area, e.g. a panel, which can be effected as a grid on which the portable electronic device can be put, slid or rotated, whereupon a locking of the device by means of one or more bolts that are mounted on the panel can occur in order to fix the device in the holder.

The holder is preferably mounted on the shopping trolley, especially on the grab bar, in such a way that the display of the docked portable electronic device is well visible for the user, i.e. most preferably has an angle of inclination between 30° and 50°, even more preferably of 45°. The angle of inclination can especially also be varied in order to adapt it to the size of the customer. For this, the holder can for example be mounted rotatably sliding around a grab handle which is circular in a vertical cross-section, whereby the rotatability can be varied by means of bolts, i.e. the holder can be locked in its new position after rotation.

In general, the type of fixation of the holder for the portable electronic device on the shopping trolley, especially on the grab bar, is not especially limited. It can be mounted movably or in a fixed position, for example, as illustrated in the figures, by means of mounting rings that are rotatable especially around the bar axis, mounting clamps or clips, via a rod assembly that is screwed or welded at a fixed position of the shopping basket or the grab bar, or else by means of direct screwing, welding or glueing with the shopping basket or the grab bar.

However, herein disclosed are also shopping trolleys which are equipped with a docking station which does not have an operative connection with the coin deposit lock, but only charges the portable electronic device of the customer while he is shopping. Specifically, herein disclosed is a shopping trolley which comprises a shopping basket with a grab bar and at least three wheels at its bottom side—as well as optionally a chain lock and a coin deposit lock for connecting the shopping trolley with another one of the same type—, whereby a docking station for a portable electronic device is provided on the shopping trolley, the docking station including a holder for the device, a power source as well as means for energy transfer from the power source to the device in order to charge the battery of the portable electronic device, wherein:

1) the holder is size adjustable and thus adapted for taking up portable electronic devices of different sizes, the holder being size adjustable preferably in both a horizontal and a vertical direction; and 2) the energy transfer means include multiple electric plugs of different formats, preferably multiple micro USB plugs with the respective state-of-the-art plug formats of different manufacturers.

Even without unlocking a not compulsory present coin deposit lock, such a shopping trolley with docking station offers a user the possibility of using his portable electronic device for a longer time while he is shopping in a store, e.g. for scanning barcodes, QR codes, for inquiring shopping lists or other information about goods, without risking to run out of battery.

In such cases, the energy transfer from the power source to the device occurs especially preferably wirelessly, i.e. using above described electrical field generators.

In FIG. 1, a total view of one example of a shopping trolley of the invention is illustrated. It includes a shopping basket 1 with a grab bar 2 and four wheels 3 (of which only three are visible in the drawing) at its bottom side, a chain lock 4 and a coin deposit lock 5 for connecting the shopping trolley with another one of the same type. At the grab bar 2, a docking station for a portable electronic device is provided, which includes a holder 7 for the device, a power source (here not illustrated, because it is accomodated within the grab bar 2) as well as means 9 for energy transfer from the power source to the device. As an energy transfer means 9, a plug 9a which is connected via a cable 9b to the power source is schematically illustrated in FIG. 1.

Figure 2:
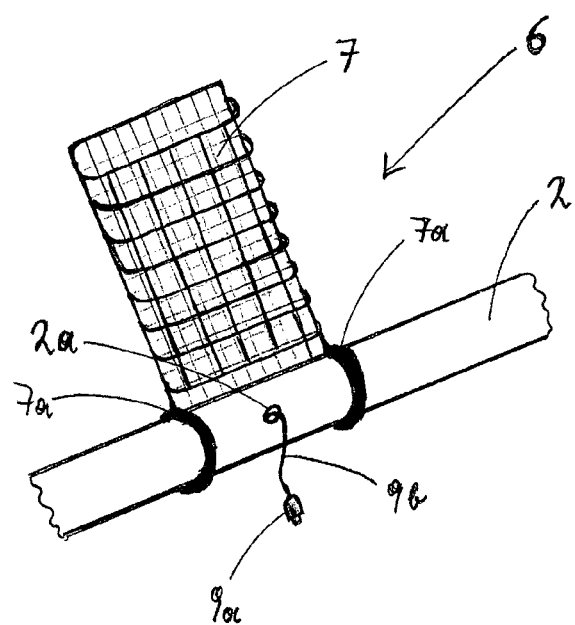
FIG. 2 is an enlarged detailed view of an embodiment of the docking station according to the invention.

FIG. 2 shows an enlarged detailed view of a relatively simple embodiment of the docking station, where the holder 7 is realized as grid basket into which the portable electronic device, in this exemplary case a smartphone, can be inserted from above. With 9a and 9b, again, the plug, in this case a micro USB plug, and respectively the cable for connecting the plug with the power source are designated. The latter is again accomodated in the grab bar 2 and therefore not illustrated. The cable 9b exits the grab bar 2 through an opening 2a. Preferably, inside of the bar 2, there is also a rewinder on which the cable 9b is automatically rewound after removing the plug 9a, until the plug 9a meets the opening 2a, and which respectively tightens the cable 9b after the plug 9a was plugged into the portable electronic device. Through the same, or else through one or more other openings 2a, in preferred embodiments, further plugs 9a may be led out in order to allow for a selection of the appropriate plug for the respective device.

In FIG. 2, the cable 9b is illustrated as only partially pulled out of the grab bar 2. This length would be enough if the micro USB port of the smartphone is provided at the lower rim of the device. However, if it is located at a lateral rim, the cable 9b has to be pulled out further in order to be able to establish a connection with the plug 9a. This documents the advantage of a plug 9a that is connected to the power source via a cable 9b as opposed to a plug that is fixedly mounted at the outer side of the grab bar 2.

The holder 7 is mounted on the grab bar 2 with two mounting rings 7a in the here shown embodiment. The rings 7a are preferably in a sliding connection with the grab bar 2 to be able to user-dependently adjust the angle of inclination of the holder 7 by rotating around the horizontal axis which runs through the center of the grab bar 2. The holder 7 and the rings 7a preferably consist of plastic, e.g. polypropylene, or light metal, e.g. aluminum, and are further preferably formed integrally, i.e. welded.

The mounting rings 7a are preferably divided at their bottom side, similar to a conduit clamp, and provided with vertical extensions with through-holes being passed through by a bolt, by means of which (and a corresponding nut) the firmness of the fit of the holder on the grab bar is adjustable. The through-holes may also include a milled or welded thread, in which case the mounting rings preferably consist of metal. Especially preferably, in this case the holder 7 as well, is made of metal and is welded with the rings 7a.

Figure 3:
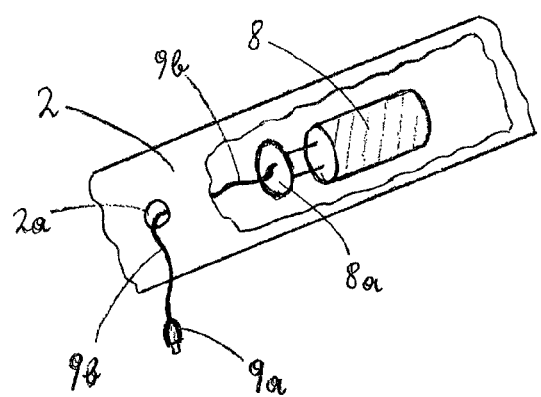
FIG. 3 is a partially pried-open view of a section of the grab bar of a shopping trolley according to an embodiment of the invention.

FIG. 3 is a partially pried-open view of a partial section of the grab bar 2 of an embodiment of the shopping trolley of the invention. It is recognizable that a power source 8, here illustrated as a cylindrical battery or accumulator, is accomodated within the grab bar 2. The battery or the accumulator, respectively, is connected via two contacts to a control unit 8a here indicated as round circuit board, to which the cable 9b of the plug 9a is connected, which in turn comes out of the grab bar 2 through an opening 2a.

The control circuit 8a may additionally include a line which connects it with the coin deposit lock of the shopping trolley, so that via the (electrically conducting) chain locks of the individual shopping trolleys in a shopping trolley line, their accumulators 8 can be charged from an external power source, unless wireless charging of the internal power source 8 by means of electrical field generators is provided.

Figure 4:
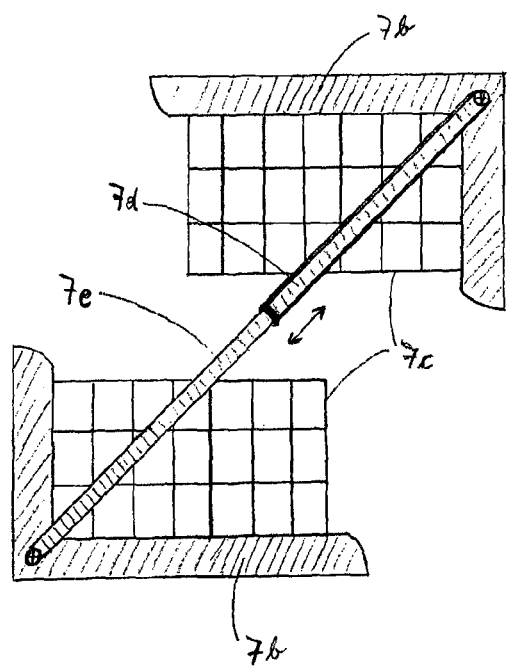
FIG. 4 is an underside view of a preferred embodiment of the holder for the portable electronic device according to the invention.

Finally, in FIG. 4, the bottom side of a preferred embodiment of the holder 7 is illustrated. It comprises two L profiles 7b, at each inner rim of which a grid 7c is provided, which serves as a flat support surface for the portable electronic device. Both L profiles 7b are connected with each other at their bottom sides (i.e. the side facing away from the portable electronic device to be docked) via a rod assembly which consists of two rods 7d and 7e. Rod 7d is hollow and has an inner diameter which is slightly bigger than the external diameter of rod 7e, so that rod 7e can be inserted into rod 7d. In this way, the two rods 7d and 7e may be shifted relative to each other, as indicated by the double arrow, which changes the total length of the rod assembly and causes a corresponding relative movement of the two L profiles 7b to each other.

The height of the L profiles 7b in a vertical direction, i.e. normal to the plane of FIG. 4, is preferably at least about 1 cm. Preferably, the grids 7c are situated at half the height of the profiles at a maximum and/or are mounted on their bottom side. That is, they are preferably each clamped, casted, welded, or glued in a groove (which is provided at a corresponding height) in the inner wall of the L profile. When the grids 7c are fixed, i.e. glued, screwed or welded, on the bottom side of the L profiles 7b, the vertical distance of the thicker rod 7d to the other L profile has to be sufficient for rod 7e so that it may be unimpededly inserted into rod 7d without the grid 7c blocking the movement.

A preferred embodiment may consist in mounting a grid 7c on the bottom side of an L profile while the other one is attached in a groove of the other profile. Thus, the two grids 7c are positioned in different planes and do not impede the movement of the L profiles 7b towards each other.

For docking e.g. a smartphone or a tablet PC into a docking station comprising such a holder as shown in FIG. 4, the device is placed on the grid 7c with its rims parallel to the arms of the L profile, whereupon the two L profiles 7b are moved towards each other by external pressure with both hands until all four arms of the L profiles 7b are adjacent to the rims of the device.

In preferred embodiments, a locking mechanism may be provided at the rod assembly which after its activation impedes further movement of the two rods 7d and 7e as long as it is not released again. In the embodiment of the holder shown in FIG. 4, the locking mechanism may be a clip being attached to the outer rod 7d and consisting of a slip-resistant material, e.g. vulcanite, which is clipped on both sides onto the junction between the two rods 7d and 7e.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A shopping trolley, comprising a shopping basket (1) having a grab bar (2) and at least three wheels (3) at its bottom side, a chain lock (4) and a coin deposit lock (5) for connecting the shopping trolley with another shopping trolley of a same type, a docking station (6) for receiving a portable electronic device being provided on the shopping trolley, the docking station comprising a holder (7) for the portable electronic device, a power source (8), and means (9) for transferring energy from the power source (8) to the device, wherein a) the docking station (6) comprises a detector for detecting insertion or placement of the portable electronic device in the holder (7) and connection of the portable electronic device with the energy transfer means (9);

b) the coin deposit lock (5) comprises an electromagnetic bolt mechanism in electrical connection with the detector;

c) the detector is able, upon detection of the insertion of the portable electronic device in the holder (7) or the connection of the device with the energy transfer means (9), to emit an electrical or electromagnetic signal to the electromagnetic bolt mechanism;

d) the electromagnetic bolt mechanism comprises a receiver capable of receiving the electromagnetic signal and to trigger unlocking of the chain lock (4) upon receipt of the signal; and e) the portable electronic device is a mobile phone or a tablet PC comprising an accumulator chargeable by energy transfer from the power source (8) via the energy transfer means (9).

2. The shopping trolley according to claim 1, wherein the signal emitted by the detector is selected from an electrical signal, a radio signal, and an infrared signal.

3. The shopping trolley according to claim 1, wherein the power source (8) is selected from a battery and an accumulator.

4. The shopping trolley according to claim 3, wherein the power source (8) is an accumulator chargeable by energy transfer from an external power source.

5. The shopping trolley according to claim 4, wherein the chain lock (4) is electrically conductive and serves for transferring energy from the external power source to the accumulator.

6. The shopping trolley according to claim 3, wherein the power source (8) is an accumulator and the wheels (3) comprise electrical generators for charging the accumulator upon movement of the shopping trolley.

7. The shopping trolley according to claim 1, wherein the power source (8) is accommodated within the grab bar (2).

8. The shopping trolley according to claim 1, wherein the holder (7) is size-adjustable and is suitable for taking up portable electronic devices of different sizes.

9. The shopping trolley according to claim 1, wherein the energy transfer means (9) comprise at least one electrical plug (9a).

10. The shopping trolley according to claim 9, wherein the at least one plug (9a) is a USB plug.

11. The shopping trolley according to claim 9, wherein the at least one plug (9a) is connected to the power source (8) via a cable (9b).

12. The shopping trolley according to claim 9, wherein the energy transfer means (9) comprise multiple electrical plugs (9a) of different formats.

13. The shopping trolley according to claim 9, wherein the detector of the docking station is able to detect establishment of an electrical connection between the portable electronic device and the at least one plug (9a) and to emit the signal thereupon.

14. The shopping trolley according to claim 1, wherein the energy transfer means (9) comprise a field generator being connected to the power source (8) for wirelessly transferring energy to the portable electronic device.

15. The shopping trolley according to claim 1, wherein the holder (7) is mounted on the grab bar (2).

16. The shopping trolley according to claim 1, wherein the holder (7) comprises a locking mechanism for fixing the portable electronic device therein.

17. The shopping trolley according to claim 16, wherein the detector is able to detect a locking of the locking mechanism when a portable electronic device is inserted in the holder (7) and to emit the signal thereupon.

\* \* \* \* \*